(12) United States Patent
Bunger et al.

(10) Patent No.: US 8,529,858 B2
(45) Date of Patent: Sep. 10, 2013

(54) ENERGY EFFICIENT, LOW EMISSIONS SHALE OIL RECOVERY PROCESS

(71) Applicant: Richard C. Russell, Taylorsville, UT (US)

(72) Inventors: James W. Bunger, Salt Lake City, UT (US); Christopher P. Russell, Salt Lake City, UT (US); Donald E. Cogswell, Salt Lake City, UT (US);

(73) Assignee: JWBA, Inc., Salt Lake City, UT (US)

( * ) Notice: Subject to any disclaimer, the term of this patent is extended or adjusted under 35 U.S.C. 154(b) by 0 days.

(21) Appl. No.: 13/720,827

(22) Filed: Dec. 19, 2012

(65) Prior Publication Data
US 2013/0183216 A1    Jul. 18, 2013

Related U.S. Application Data

(63) Continuation of application No. 12/565,288, filed on Sep. 23, 2009, now Pat. No. 8,336,621, which is a continuation of application No. PCT/US2008/058112, filed on Mar. 25, 2008.

(51) Int. Cl.
*B01D 53/62*  (2006.01)
*B01D 53/50*  (2006.01)
*B01D 53/56*  (2006.01)
*B01D 53/60*  (2006.01)
*B01D 53/96*  (2006.01)

(52) U.S. Cl.
USPC ... 423/230; 423/225; 423/239.1; 423/243.08; 423/244.07; 423/244.08

(58) Field of Classification Search
USPC .................. 423/220, 225, 230, 239.1, 243.08, 423/244.07, 244.08
See application file for complete search history.

(56) References Cited

FOREIGN PATENT DOCUMENTS
JP    H03-072914    *  3/1991
* cited by examiner

*Primary Examiner* — Stanley Silverman
*Assistant Examiner* — Daniel Berns
(74) *Attorney, Agent, or Firm* — James Sonntag

(57) ABSTRACT

A process for the energy efficient, environmentally friendly recovery of liquid and gaseous products from solid or semi-solid hydrocarbon resources, in particular, oil shale or tar sands. The process involves non-oxidative pyrolysis to recover fluid energy values, oxidative combustion to recover energy values as recoverable heat, and environmental sequestration of gases produced.

2 Claims, 9 Drawing Sheets

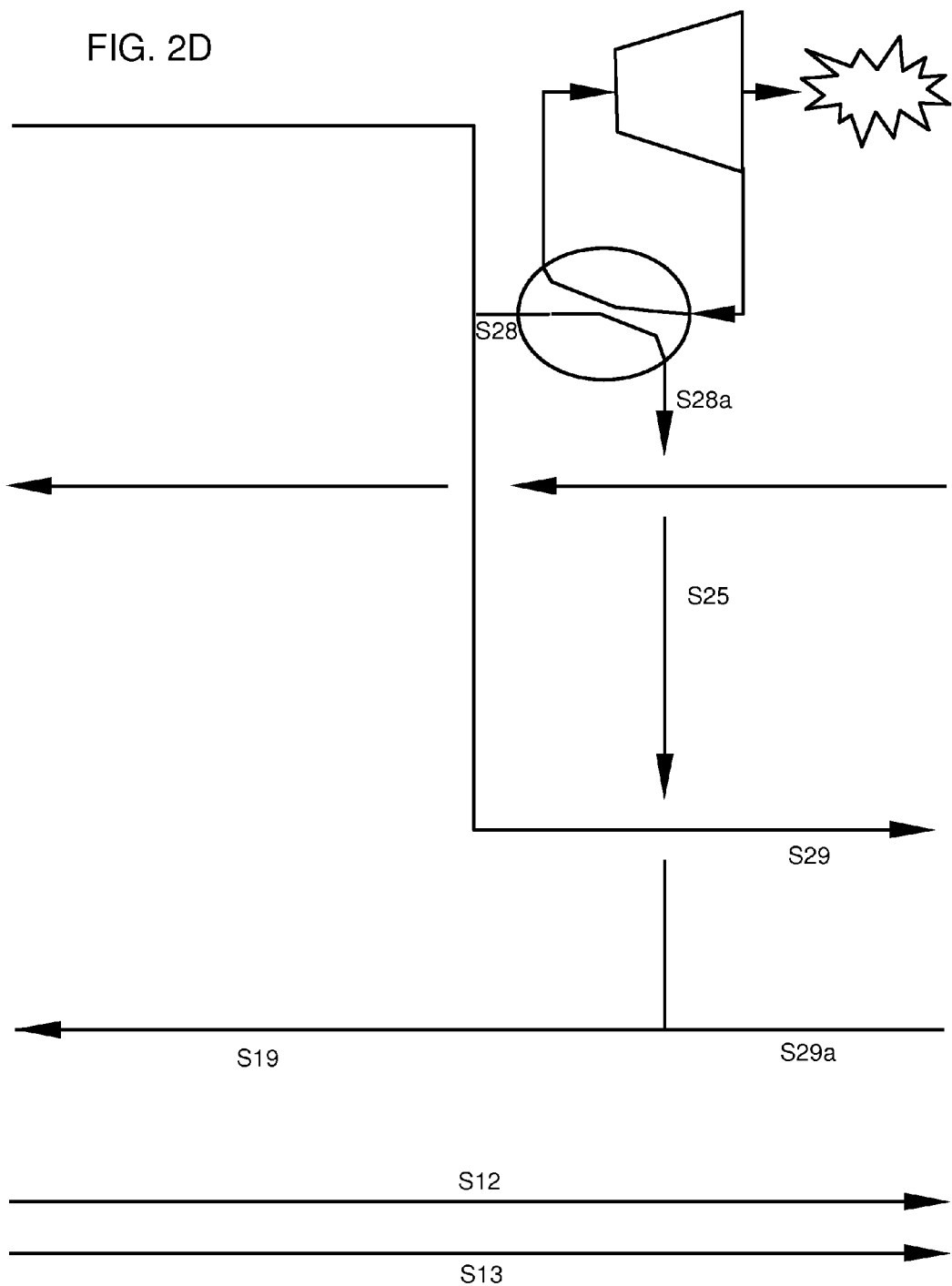

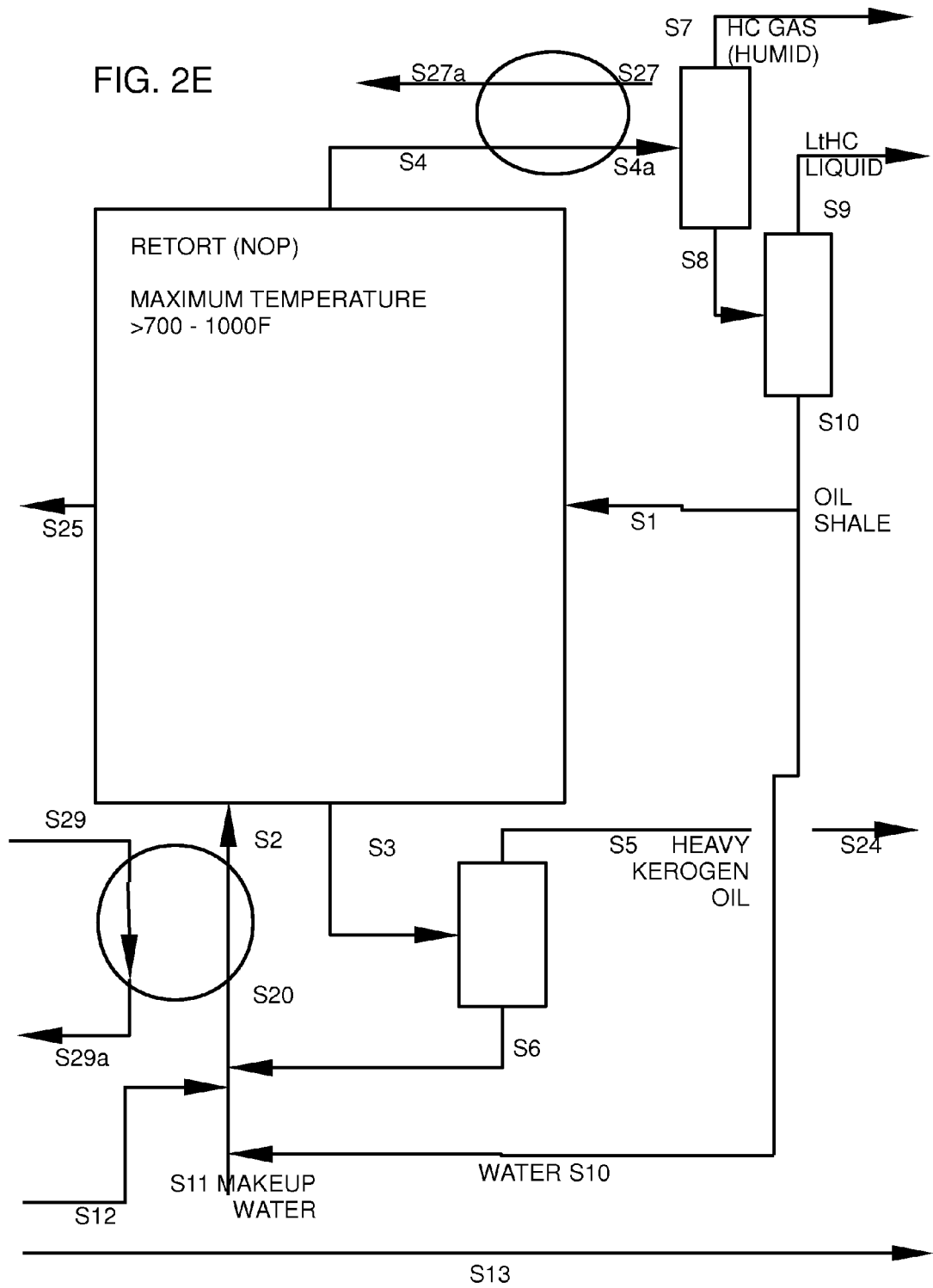

ENERGY EFFICIENT, LOW EMISSIONS SHALE OIL RECOVERY PROCESS

CROSS REFERENCE TO RELATED APPLICATIONS

This application claims priority from U.S. patent application Ser. No. 12/565,288, filed 23 Sep. 2009, which is a continuation from International Application under the PCT, Application No. PCT/US08/58112, filed 25 Mar. 2008, which claims priority from U.S. Provisional Patent Application 60/896,933, filed 25 Mar. 2007, which applications are hereby incorporated by reference.

BACKGROUND

Recovery of oil from oil shale involves heating the oil shale rock to sufficient temperature such that kerogen, the organic material contained in oil shale, converts to gases, liquids and residue. The residue, which may be a form of coke, is left deposited on the mineral matter of the oil shale. In the prior art the principal objectives of such processes are to (a) efficiently get the heat into the oil shale rock and (b) separate the desirable products from the spent oil shale.

The process of heating oil shale to conversion temperatures is generally called retorting, a word of European origin that describes a process for distillation or destructive distillation. The retorting process may be conducted in-situ by supplying heat to a bed of ore largely undisturbed. The retorting process may also be conducted by modified in-situ, by first preparing the bed of ore prior to heating. Retorting may also be conducted in surface vessels to which mined ore is introduced.

In the prior art, the methods for recovering oil values have exhibited various problems that adversely affect the efficiency or reliability, which in turn, adversely affect the economics. For example, vertical, solids down-flow, product up-flow processes have proven to be reliable, but yield a relatively low grade of product because the product is required to exit the reactor overhead, forcing the product to remain in the reactor longer than desirable. Vertically-inclined retorts that provide a means for removal of products from the bottom (product down-flow), and counter-currently pump the ore from the bottom by means of a 'rock pump' (solids up-flow) have proved to suffer from poor mechanical reliability.

Horizontally-inclined vessels, patterned after rotary kilns, suffer from slow heat transfer and result in much larger vessels than vertically-oriented vessels and are expensive to fabricate. True in-situ methods, while lower in capital costs, are not as controlled and result in uncertainty about legacy environmental issues such as ground water contamination. Modified in-situ methods experience better control than true in-situ, but might result in poorer control than surface processes. Modified in-situ processes are also likely to suffer from lower production efficiency compared to surface processes.

In historic retorting processes the production of $CO_2$ from decomposition of carbonate minerals was not considered an environmental issue. However, it was considered an energy consumption issue in that decarbonation is an endothermic reaction and consumes up to 8% of the energy value available from the ore. Various proposals have been made to limit the amount carbonate decomposition that gives rise to these endothermic reactions, the most common being maintaining a temperature below which decomposition occurs. However, a lower final temperature results in a lower rate of production, and possibly lower product yields.

Tar sands are also processed to recover and convert the organic materials (bitumen) to marketable products. In typical practice tar sands are mined, mixed with water, and the bitumen (tar) is separated from the sand by flotation. In yet other practice pipes are laid, or drill-holes are made into a bed of the resource and steam is injected to raise the temperature of the bed. Viscosity of the bitumen is reduced, which then drains to a second lower pipe where it is withdrawn. While practiced in rich, unconsolidated ores such as those found in Alberta, Canada, not all resources in the United States or Canada are rich or unconsolidated. Some are consolidated, with low permeability and sufficiently lean (lower grade) that only small amounts of bitumen are recovered by water extraction or will drain in a steam stimulation process. In principal, tar sands can also be retorted.

Thus, there remains a need for a process that is efficient, reliable, environmentally friendly and cost-effective for both oil shale and tar sand resources.

SUMMARY

Both the environmental problems with $CO_2$ production and the associated energy losses are solved by means of a three cycle system that is energy self-sufficient and thermodynamically efficient. The cycles are comprised of non-oxidative pyrolysis (NOP), oxidative combustion (OC), and environmental sequestration (ES).

An aspect is an OC cycle where metal carbonates (mostly of Ca, Mg, K, and Na) are allowed to decompose (decarbonation), but are restored to their metal carbonate form through recycle of $CO_2$ rich gas (recarbonation). When recycling $CO_2$ to the inlet of the OC cycle, the resulting recarbonation of metal oxides is exothermic, and this exothermic energy is captured by the gases and is used to raise steam. Thus, the process suffers a lower or no net energy penalty from the initial endothermic decarbonation reactions, while at the same time allowing for high temperature combustion which favors faster reaction kinetics and more efficient energy utilization.

Substantially all of the $CO_2$ produced from decarbonation reactions is reacted with the metal oxides to reverse the decarbonation reaction. Further, by passing the combustion gases through alkali metal oxide/carbonate beds in the OC cycle and in an ES cycle, other pollutants are sequestered. A stoichiometric excess of $CO_2$, produced substantially from the combustion of organic carbon, is collected at the outlet of the ES cycle. The result is a clean, industrial grade $CO_2$ suitable for oil field injection, as a displacement gas for coal-bed methane, as a hydroponic gas, as an inerting gas, or any variety of industrial uses of $CO_2$. Industrial grade $CO_2$ that displaces $CO_2$ produced naturally or by recovery from air serves the purpose of reducing, or at least not adding to the $CO_2$ that otherwise would be released. The pure $CO_2$ may also be sequestered in geologic formations.

Another aspect is configuring the NOP cycle such that oil is recovered from the bottom and gas is recovered from the top by using a flow of heated gas. A suitable gas is steam, because steam has a high vapor heat capacity and is readily separated from produced gases. Other gasses are contemplated, but may be less satisfactory, such as, for example, carbon dioxide, nitrogen, or light hydrocarbons of about 5 carbons or less. Oxidizing gasses cause deleterious effects on product yield and quality. Direct heating the bed using hot inert gasses also allows for precise temperature control where adequate retort rates are achieved while avoiding the premature decomposition of carbonates. Conditions are such that liquid products are not vaporized or atomized into a gas stream, but are allowed to drain through the bed where they can be withdrawn from the bottom. Withdrawing a large portion of the product as in a liquid phase provides several yield and product quality benefits over withdrawing most of the product in a gas phase.

Another aspect is to provide an ES cycle by using the spent oil shale bed as an environmental sequestration bed for oxides of N and S. Fully carbonating the ES bed also leaves a relatively pH neutral spent shale for land fill.

Another aspect is producing industrial grade $CO_2$ from the excess $CO_2$ produced. This is, in part, accomplished by producing the carbon dioxide in a separate OC cycle, where carbon dioxide is produced by combustion and metal carbonate decomposition, whereas the hydrocarbon product is produced in the NOP cycle, where product is produced under conditions where a minimum of carbon dioxide is formed. Accordingly, there is no need to separate hydrocarbon product and carbon dioxide from a single outlet steam. This allows for optimization of the hydrocarbon product without materially comprising the ability to produce a purified, industrial quality carbon dioxide product. In addition, the separate NOP and OC cycles allow for optimum removal of residual hydrocarbons from the bed without compromising the product through excess combustion of product and excess introduction of carbon dioxide into the product stream.

A purified carbon dioxide product is also largely achieved by use of the optional ES cycle, which is used to sequester undesired contaminants from the final carbon dioxide stream.

Another aspect is controlling the system for essentially energy self-sufficient operation. Once the process is started there are no external demands for power or fuel (If liquid fuels are needed additional systems can be provided, for example, an on site upgrader, and fuel preparation facility produces the needed fuels from the liquid product).

Among the advantages of the present process is its energy efficiency. Virtually all of the original energy values in the oil shale are converted to either products or heat energy. The products are high quality and the heat energy (high temperature) is high quality. Thus, utilization of the produced values is economically and thermodynamically enhanced, and losses are reduced to a minimum. Much of the original energy value of the hydrocarbonaceous materials of the ore is recovered as fluid products during the NOP cycle. Remaining energy values in the residual materials are recovered during the OC cycle where these materials are oxidized, producing a high-temperature effluent gas from which heat is recovered by steam production, or the like. Energy consumed by decarbonation of metal carbonates to metal oxides in the OC cycle is recovered by recycling carbon dioxide back into the bed under conditions to convert the metal oxides back to metal carbonates, producing heat that is passed into the effluent gas.

DETAILED DESCRIPTION

Figure 1:
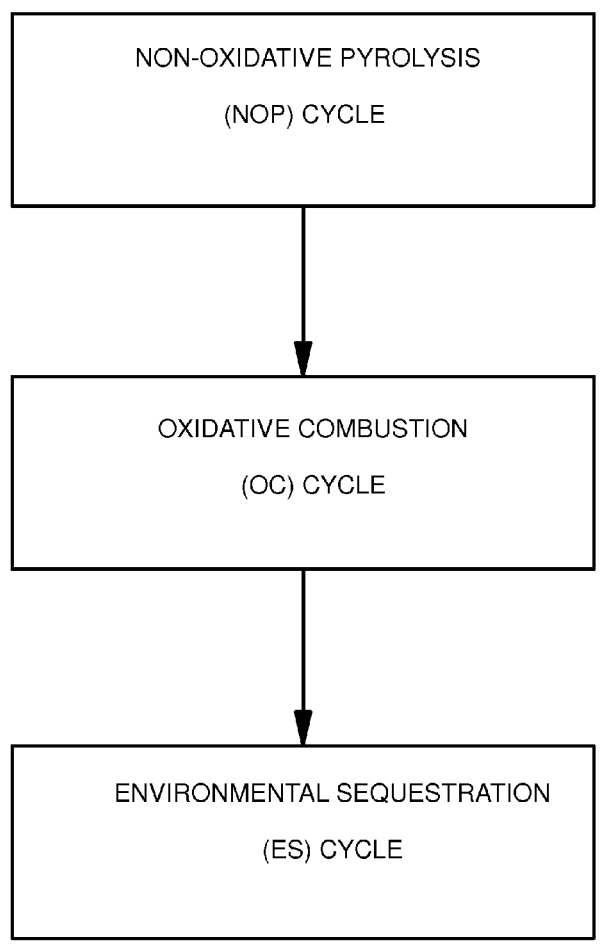
FIG. 1 is a flow sheet of illustrated an ore treating process.

Referring to FIG. 1, a hydrocarbonaceous containing rubblized ore is treated successively in three cycles, a non-oxidative pyrolysis (NOP) cycle, an oxidative combustion (OC) cycle, and an environmental sequestration (ES) cycle.

Figure 2A:
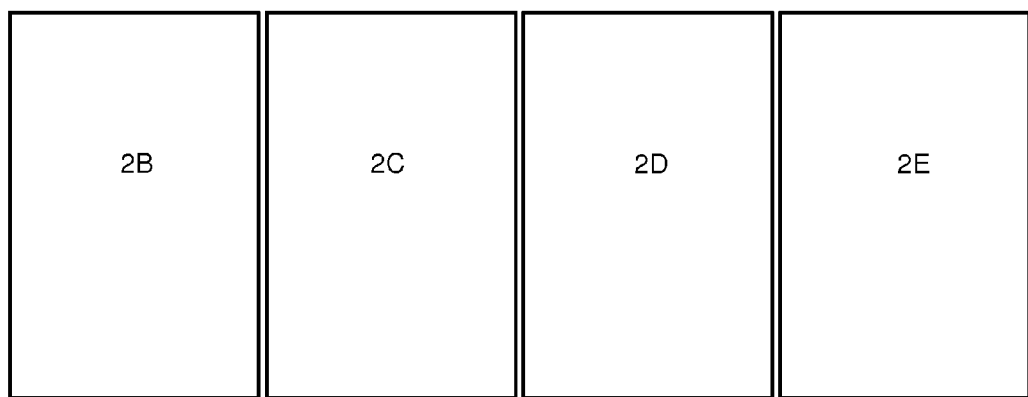
FIG. 2 is in five parts, FIG. 2A to 2E. When 2B, 2C, 2D, and 2E are arranged as in 2A, they show a mass balance diagram illustrating an exemplary embodiment.
Figure 2B:
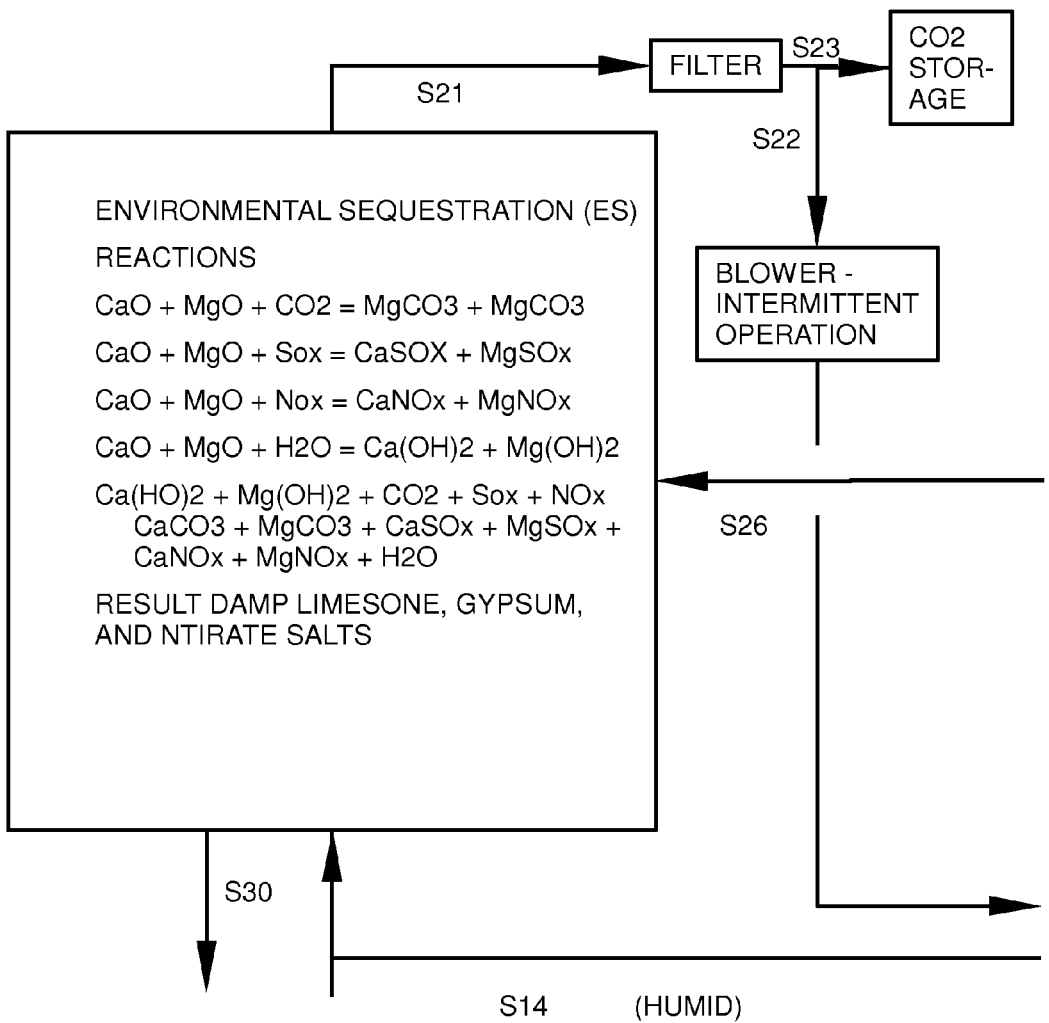
Figure 2C:
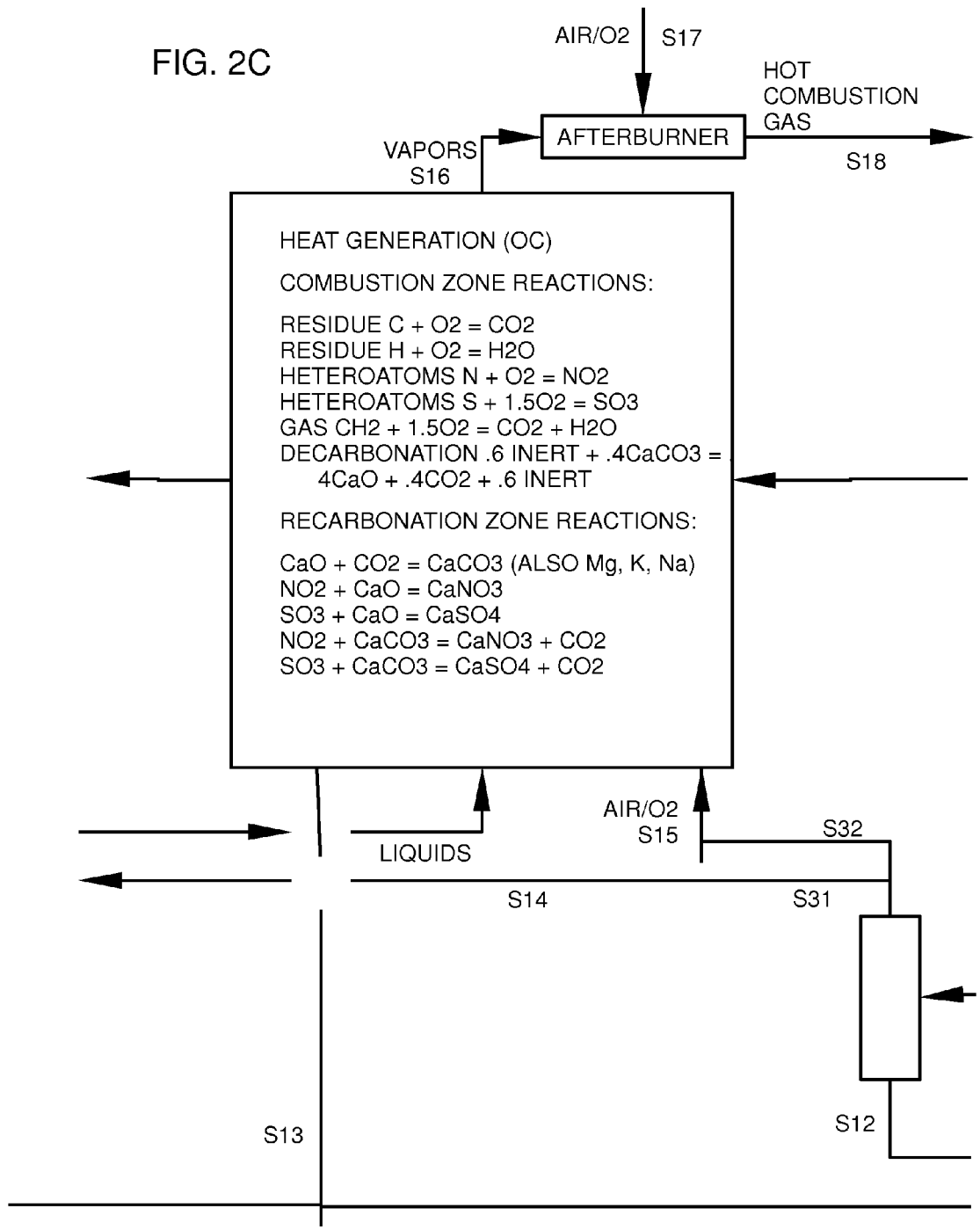

Reference is now made to FIG. 2, which is a mass balance chart exemplifying a process. In a reactor space an NOP cycle is conducted with a fixed or moving bed of oil shale. The bed is heated by direct contact with steam, introduced through suitable injectors, such as for example, slotted pipes, nozzles, grates or other convenient means. Steam is introduced until the bed is heated to temperatures high enough to achieve substantial conversion of kerogen to oil and gas with minimal decomposition of carbonate minerals found in the oil shale, e.g. at a maximum temperature greater than about 700 degrees F., for example, between about 700 and 1000 degrees F. The bed is so configured as to allow produced liquids to drain to the bottom of the bed by gravity, where they are withdrawn through a suitable outlet. Gases are withdrawn from the upper portion of the bed by gas lines, or any convenient means.

The reactor space conditions are then changed for an OC cycle. In the OC cycle an oxidizing gas, such as air, oxygen-enriched air, or oxygen, is introduced to the bed through the same or different injectors used for the introduction of steam. Residual hydrocarbonaceous material left on the mineral surface from the kerogen conversion is combusted to generate heat and which during the process of combustion forms $CO_2$, $H_2O$, oxides of sulfur and nitrogen, as well as small amounts of other constituents. During the OC cycle high temperatures are desired in order to accelerate the oxidation reaction rate and provide for efficient heat utilization. In the high temperature combustion zone, metal carbonates, principally alkali metal carbonates, are allowed to decompose to $CO_2$ and their corresponding metal oxides. The hot gas so produced during combustion, consisting predominantly of $CO_2$ and $H_2O$, if oxygen is used and $N_2$, $CO_2$ and $H_2O$ if air is used, as well as lesser amounts of oxides of nitrogen and sulfur, is withdrawn from the reactor through gas withdrawal lines. Heat is recovered from the hot OC combustion gas to produce steam using steam generators of any suitable construction. The steam can then be cycled for use in the NOP cycle. Excess steam may be used to produce power, by, for example, steam turbines, or can be used directly where shaft power is required to power the process, such as compression of air in the air separation process, blowing of the oxidizing gas, or flue gas to the ES cycle or for driving electrical generators. The electricity is also used on-site to power the process; and excess electricity is sold to the electric grid.

During the OC cycle $CO_2$ is produced both from the combustion of the residual organic matter and the decomposition of carbonates. After recovery of heat from the OC gas a portion of the cool $CO_2$-laden gas is recirculated along with the air or oxygen to the bottom of the OC bed, where it cools the lower bed and restores the alkali metal oxides to their carbonate form. Oxides of nitrogen and sulfur contained in the stream are deposited on the combusted shale where they react to form alkali metal salts. Oxides of N and S, being more acidic than oxides of C or H, will preferentially displace carbonates or hydrates on the combusted shale. Excess $CO_2$ not required for conversion of alkali metal oxides to carbonates absorbs heat from the upper bed and along with newly formed combustion gases and is directed to the steam generators as the combustion gas stream. The flow rate of the $CO_2$-laden gas recycled into the OC cycle can be selected to adjust the temperature of the exit gases to a desired temperature or to adjust the rate of heat generation to coincide with the desired rate of steam production for the retorting in the NOP cycle and electric power generation.

As the OC cycle progresses, starting at the bottom of the bed a zone becomes cooled and metal oxides are there converted to carbonates from the cooled carbon dioxide in the gas recycle. As this cooled recarbonation zone progresses up through the bed, the hot combustion zone where residues are oxidized and metal oxides formed travels up and above the cooler zone. When the combustion zone reaches the top, or when the OC cycle has consumed essentially all of the available fuel (residue material) in the bed the reactor zone is switched to an ES cycle. At the same time, a reactor bed operating under a NOP cycle is switched to OC cycle, and a freshly prepared bed is started on the NOP cycle, thus making a semi-continuous process from a series of batch processes.

Accumulations of $CO_2$-laden gas (that also contains oxides of nitrogen and sulfur) greater than that necessary for the OC and NOP cycle are sent to a third, ES cycle, which follows the OC cycle. In the ES cycle, the $CO_2$-laden gas is injected into the bed through the piping or inlet system previously installed. Additional cleaning of the $CO_2$ occurs and essentially all of the remaining oxides of nitrogen and sulfur are sequestered. The cleaned $CO_2$ gas is withdrawn by suitable means as product. If oxygen is utilized as the oxidizing gas in the OC cycle, relatively pure $CO_2$ is produced for sale or use. If air is used, a clean, enriched stream of $CO_2$ in $N_2$ is produced which is suitable for recovery of $CO_2$ by conventional gas separation technologies. Whether to separate the $N_2$ from $CO_2$ at the tail end of the process or to separate the $N_2$ from $O_2$ at the beginning of the process is a matter of economic optimization. In either case highly concentrated $CO_2$ can be produced for industrial use.

Reference is now again made to FIG. 2, which is a mass-balance diagram. This diagram is based upon preliminary modeling and can be understood with reference to the above discussion. In Table I is a listing describing the stream names. The NOP cycle is shown by the box on the right, with heated steam stream S2, which has been heated by combustion vapors S29 from the OC cycle (shown as the middle box). Some of the exhaust vapors S28 are used to generate steam for plant power requirements. Cooled exhaust vapors S19 from the OC cycle are dewatered to S31 and split into two streams, one a recycle to the OC reactor S32, and the other, the excess $CO_2$ stream S14 is directed to the ES cycle (box on the left). Obviously, control of heat duties is conducted to make operational use of heat available.

TABLE I

| Stream Names | |
| --- | --- |
| S1 | Oil shale feed, or initial charge |
| S2 | Hot steam or other inert gas |
| S3 | liquid products and water |
| S4 | vapor products and steam |
| S4a | condensed vapor products and water |
| S5 | primary oil products |
| S6 | retort water for recycle |
| S7 | non-condensable hydrocarbon gases |
| S8 | condensed light overhead product and water |
| S9 | condensed light hydrocarbon product |
| S10 | condensed water for recycle |
| S11 | makeup water (could derive from S27a) |
| S12 | condensed water from combustion gas |
| S13 | secondary oil products |
| S14 | excess combustion gas for ES cycle |
| S15 | oxidizing gas for OC cycle |
| S16 | vapors from OC cycle |
| S17 | oxidizing gas for afterburner on OC cycle |
| S18 | hot combustion gas |
| S19 | combined cooled and condensed combustion gas |
| S20 | combined water to steam generator |
| S21 | pure $CO_2$ or pure $CO_2$ + $N_2$ (may contain filterable particulates) |
| S22 | intermittent recycle for process control purposes |
| S23 | $CO_2$ product |
| S24 | combined oil products (optional) |

TABLE I-continued

| Stream Names | |
| --- | --- |
| S25 | solids at completion of NOP cycle |
| S26 | solids at completion of OC cycle |
| S27 | cooling water |
| S27a | warm cooling water |
| S28 | hot combustion gas split for steam turbine exchanger |
| S28a | cool combustion gas from turbine steam exchanger |
| S29 | hot combustion gas split for retort steam exchanger |
| S29a | cool combustion gas from retort steam exchanger |
| S30 | solids at completion of ES cycle |
| S31 | dewatered combustion gasses |
| S32 | combustion gas recycled to OC cycle |

In another example based upon preliminary modeling, a 50,000 bbl/day plant charging 25 gpt oil shale results in the following overall mass balance (assume 85% efficiency on Fischer assay, but recover the remaining 15% as combustion heat, before losses). This balance assumes all $CO_2$ produced from carbonate decomposition is sequestered on the spent shale. This is a model of a modified in-situ process where there is lower energy lost to the environment. While it is not possible to run any system with absolutely no energy loss due to edge effects, (e.g., piping, loses to surrounding), an in-situ process would be expected to show lower energy loss than a surface process, which may show slightly greater energy loss. The mass and energy balances are shown in TABLE II

TABLE II

| Mass balance | |
| --- | --- |
| In | |
| Organic matter in = | 14,979 |
| Oxygen consumed = | 12,100 |
| | 27,079 ton/day |
| Out | |
| Noncondensible gases = | 1,486 |
| Naphtha = | 3,775 |
| Mid distillate shale oil = | 4,134 |
| Heavy shale oil = | 1,396 |
| CO2 (98% indust. grd) = | 13,064 |
| Water (to tailings) = | 2,854 |
| $NO_2$ (sequestered) = | 291 |
| $SO_3$ (sequestered) = | 79 |
| | 27,079 ton/day |
| Energy balance (no energy imported) | |
| In | |
| Energy available in oil shale = | $5.61 \times 10^{11}$ Btu/day |
| Out | |
| Energy in oil and gas products = | $4.04 \times 10^{11}$ Btu/day |
| Electric energy produced = | 11,000 MW-hr/day (537 MW plant) |
| Heat lost to surroundings = | $4.7 \times 10^{10}$ Btu/day |
| Estimated First Law efficiency = | (56.1 − 4.7)/56.1 = 92% |

In the practice of the process in which fixed beds are utilized, it can be operated with three reactors that will operate simultaneously. In the figure, a first, second and third reactors are provided. In the first reactor at this point in operation, an NOP cycle is in progress, which receives steam produced from the heat, energy generated for the second OC reactor. In the third reactor an ES cycle is in progress and finishes the cleanup of the produced $CO_2$ gases. The cycles continue until all of combustible, residual material in the OC cycle in the second reactor has been combusted, at which time the second reactor changes from an OC cycle to an ES cycle.

The NOP cycle in the first reactor is changed to an OC cycle. A new NOP cycle is brought on-line. In practice of a fixed bed configuration, four units can make a convenient full cycle, with one unit being discharged and recharged, and, freshly prepared in anticipation of its next use, during the time the other three are on their respective cycles.

In an optional operation of multiple reactors, the temperature and heat flows are controlled in such a fashion as to facilitate steady-state operation and to complete NOP cycles simultaneously with the completion of OC cycles. Upon completion of the NOP and OC cycles, the cycle in the respective reactors is switched and NOP and OC cycles initiated in different reactors. For example, previous NOP reactor becomes the next OC reactor. The previous OC reactor becomes the next ES reactor. The previous ES reactor may be taken off-line or used as an additional ES reactor for further sequestration of NOx and SOx produced in miscellaneous flue-gases throughout the process.

The fixed bed may be configured in surface vessels situated side by side and operated in a swing configuration, or three modified in-situ cells. The modified in-situ cells may be constructed by the staged blasting technique of Geokinetics, the partial mining and rubblization concept forwarded by Occidental oil shale, or an engineered cell, for example, engineered cells similar to Red Leaf capsule technology.

In principle, the process could be applied to reactor units engineered for true in-situ, especially if some form of gaseous or liquid communications is provided. Such communications could be provided through vertical or horizontal drill- or boreholes, conduits, hydraulic fracturing, or other convenient means. Variations may include an initial short-term combustion cycle to open up the fractures that would facilitate larger, successive steam flows. Upon completion of the NOP cycle the permeability of the bed is greatly enhanced, allowing for an efficient combustion cycle and efficient sequestration in the ES cycle.

In a modified in-situ system an inclined, engineered, permeable bed of oil-bearing ore is constructed and the permeable bed may be encapsulated between impervious layers. The engineered impervious layers may be omitted if geophysical and hydrological conditions allow. A bed under NOP cycle conditions is heated by introducing steam through a first porous pipe, situated in the lower portion of the bed. A second porous pipe, situated in the upper portion of the bed accepts vapors produced in the process. As many porous pipes as are needed for effective recovery may be laid in the bed. Heating of the bed continues until a desired temperature is reached and a desired reaction is complete.

Vapors, which may consist of condensable hydrocarbons, non-condensable gases, and water vapor, are cooled; non-condensable gases are collected for sale, further processing, or used on-site. Condensed liquids are sent to a separator where light hydrocarbons are decanted in an overflow, and water is withdrawn from the underflow for recycle to the steam generator. Liquids, consisting of both an oil and aqueous phase, produced within the bed drain to a sump at the lower end of the bed where they are pumped to the surface for separation into their respective phases. The oil phase is sold or further processed.

When the bed is switch to OC cycle conditions, the oxidation (combustion) reaction is initiated in the vicinity of the first porous pipe and air or oxygen is injected at a controlled rate. The air or oxygen is diluted with an amount of $CO_2$ for purposes of (a) controlling combustion temperature, (b) converting alkali metal oxides to their respective carbonates, and (c) controlling heat recovery from the hot, combusted shale.

The oxygen inflow rate is controlled to be sufficient to support combustion, but insufficient to cause premature breakthrough of the oxygen in the exit gas. Hot gases from the combustion flow by pressure differential toward a second porous pipe where they are withdrawn and used to generate steam, preheat water, or other beneficial use of heat. The OC cycle is allowed to continue until all, or a practical amount, of the combustible fuel left from the NOP cycle is consumed. The now relatively cool cell resulting from the now complete OC cycle is switched to serve as the ES cell. Additional liquids that may be produced during the OC cycle are sold, processed separately from liquids produced in the NOP cycle, or combined with liquids produced in the NOP cycle for sale or further processing.

When the bed is operated under ES cycle conditions, cool flue gas (vapor products from the OC cycle or other surface combustion process) is introduced to the first porous pipe. The vapors are allowed to contact the partially cooled bed where the $CO_2$, NOx, SOx, and $H_2O$ substantially react with the activated ore where they are sequestered respectively as carbonates, nitrates, sulfates, hydrates, and related compounds.

In ordinary practice it is contemplated that there be at least three modified in-situ beds, and the cycles are performed in semicontinuous, sequential fashion. That is, a first bed having advanced to the ES stage would receive cooled flue gas whose heat has been recovered for beneficial use that was, produced in a second OC bed, which in turn, had previously completed the NOP cycle in a third bed. While the process is operating a new NOP cycle is being prepared in anticipation of a changeover of cycles. Thus, the process achieves a near steady state by marching the sequence of cycles through beds constructed in the resource zone. If the resource geometry allows, multiple simultaneous sequences are operated, staged in such a fashion as to produce steady product flow and make efficient use of labor and equipment.

In another aspect, a moving bed system is provided where the three cycles may be performed in three surface vessels. One vessel serves as a continuous NOP reactor, the second as a continuous OC reactor and the third as a continuous ES reactor. Prepared ore is charged to the top of the NOP vessel. Steamed or heated ore is removed from the bottom of the NOP vessel and charged to the top of the OC vessel. Hydrocarbon-free, reduced-temperature solids are removed from the bottom of the OC vessel and charged to the top of the ES vessel. Finishing of $CO_2$ purification and cooling occurs in the ES vessel. Cool, environmentally benign solids are discharged from the bottom of the ES vessel and sent back to the mine area for storage and land reclamation.

In an aspect of the semicontinuous, sequential operation of several beds of ore, once an operation with three cycles (NOP, OC, and ES) is in operation a new bed is prepared for a new NOP-cycle. The new NOP cycle bed can be initially preheated to make use of low grade heat as available. This new bed is brought into the operation once the initial NOP bed is completely reacted, at which time the initial NOP bed is switched to an OC cycle and the previous OC cycle is switched to an ES cycle. In instances where the optional ES cycle is not used, the sequence is similar, but without the ES cycle. If surface-engineered reactors are used, the prior ES zone is then converted to the next NOP zone and thus, the process cycles more or less continuously. If the zones are subsurface (in-situ or modified in-situ) there is no need to complete the initial ES cycle before a new NOP cycle is initiated. In principle there could be at any given time several NOP cycles in various stages of heatup, several OC cycles in various stages of oxidation and several stages of ES cycles in various stages of cooldown and sequestration.

Figure 3A:
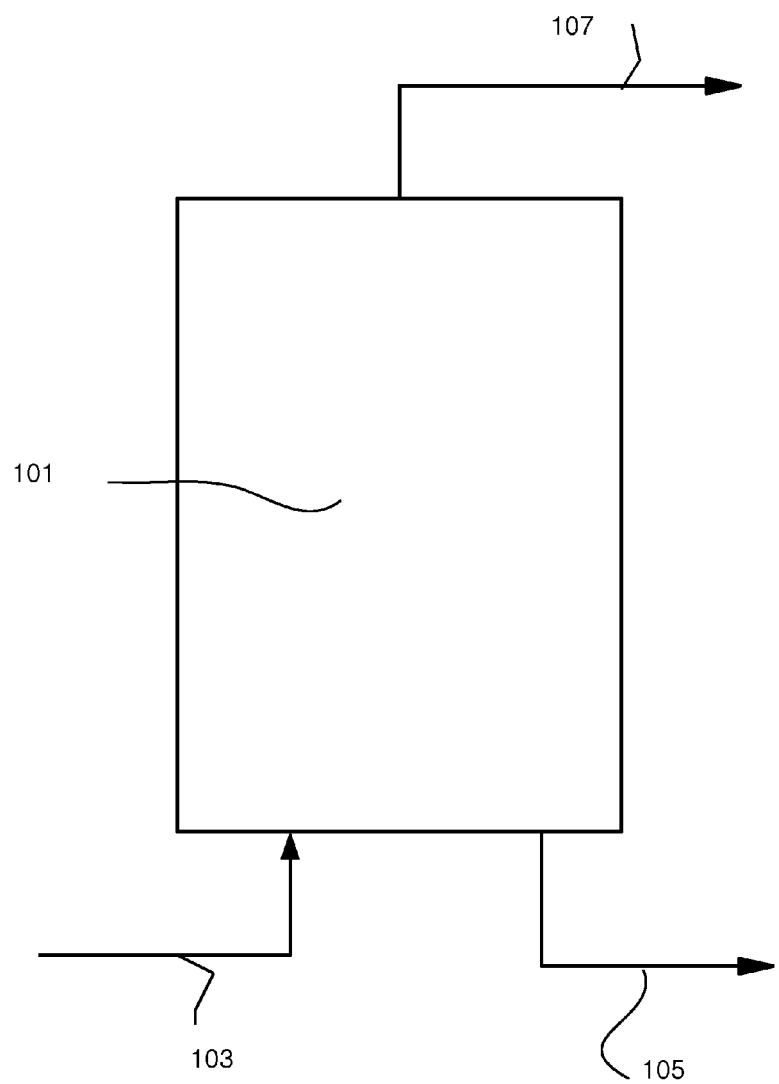
FIGS. 3A, 3B, and 3C are schematics illustrating an exemplary bed of ore treated by an exemplary process.
Figure 3B:
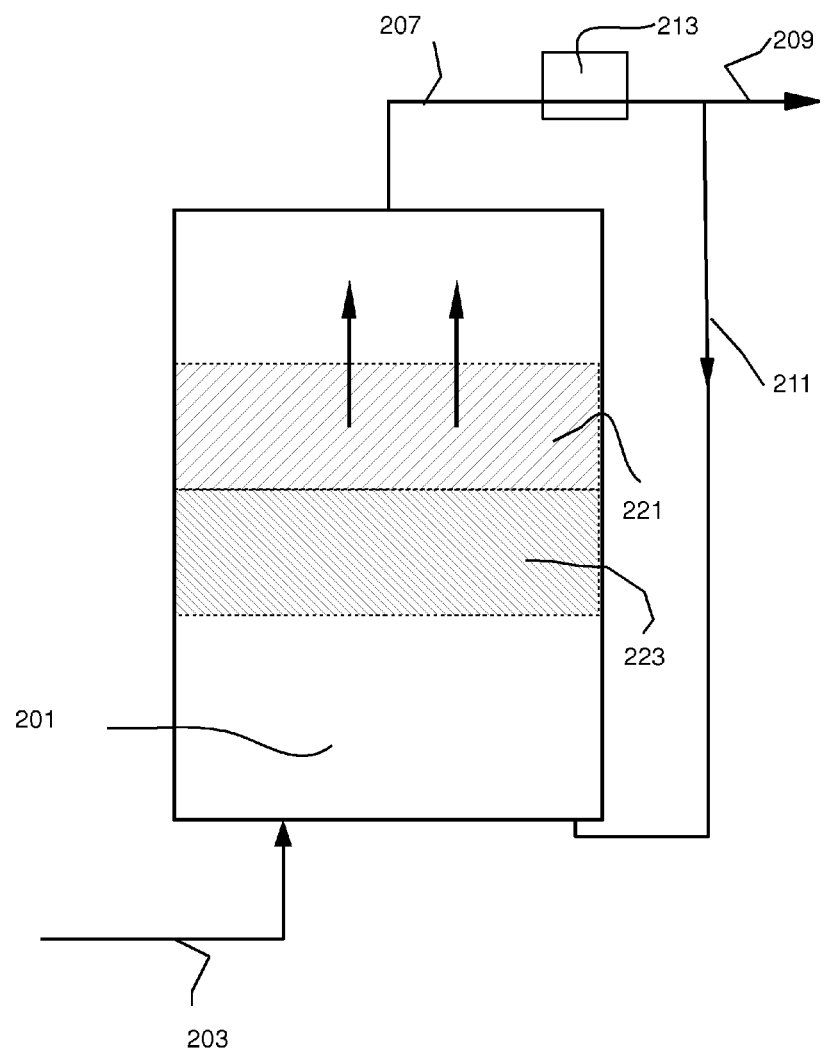
Figure 3C:
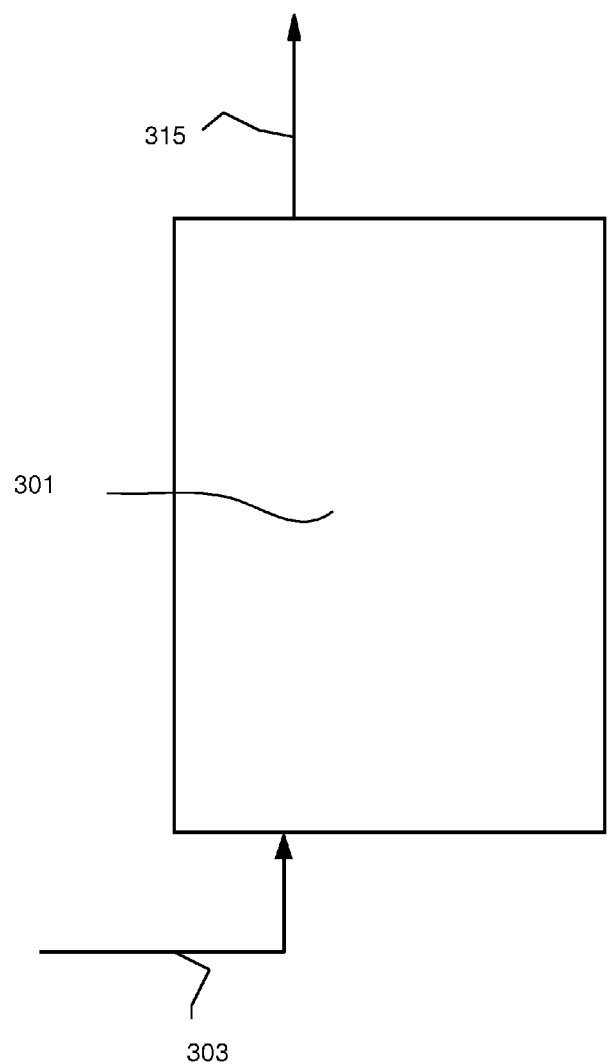

Reference is now made to FIGS. 3A, 3B, and 3C, which are schematics that illustrate an exemplary bed of ore as it is treated by an exemplary process. In FIG. 3A is a rubblized bed of ore 101 containing hydrocarbonaceous materials. In the NOP cycle, a heated gas is introduced through line 103, which heats the ore producing a fluid product, the liquid portion being withdrawn though line 105 and the vapor portion being withdrawn through line 107.

Referring now to FIG. 3B, in the OC cycle, heated oxygen containing gas is introduced through line 203, to create a combustion zone 221 in the bed 201. The heating and the combustion/oxidation of remaining hydrocarbons in the bed creates temperatures in the combustion zone where a portion of carbonates in the ore decompose to oxides, forming carbon dioxide gas. The gaseous combustion products and carbon dioxide are withdrawn as an effluent gas stream through line 207. After heat is recovered from stream 207 through suitable means 213, the effluent gas stream is split to form an ES steam 209, and recycle stream 211. The cooled recycle stream is introduced into the bed below the combustion zone and creates a recarbonation zone 223 in the bed. The carbonation zone occurs where the combustion zone has already depleted the ore of hydrocarbons and formed metal oxides, and is at temperature conditions lower than in the combustion zone due to introduction of the cooled recycle stream. Under these conditions carbon dioxide in the recycle stream combines with metal oxides that were formed when the combustion zone passed up through the same region ore. The combustion zone with the recarbonation zone behind it passes up through the reactor until the combustion zone reaches to the top and the combustion and decomposition reactions cease. Whatever the kinetics or equilibrium thermodynamics of the recarbonation of various alkali oxides, there is a temperature zone in the cooler recarbonation process which is favorable to the recarbonation reaction, which is also enhanced by an excess of $CO_2$ in the recycle gas.

Referring to FIG. 3C, an ES stream, which may originate from another bed of ore being treated, such as 209 in FIG. 3B, is introduced into the recarbonated ore bed 301 through line 303 and as gas from the ES stream passes up through the bed metal oxides in the bed sequester nitrogen and sulfur oxides in the gas. A cleaned gas stream is withdrawn through line 315. Piping and conduits can optionally be used for dual purposes. For example, lines 107 and 207 may be the same or different conduits, and likewise for lines 103, 203, and 303.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for capturing carbon dioxide from a gas stream to form a purified carbon dioxide gas stream, the process comprising:
   (a) dividing a carbon dioxide containing gas stream to an environmental sequestration (ES) stream and a cycle stream,
   (b) contacting the cycle stream with a metal oxide at temperature conditions that permit reaction of carbon dioxide in the gas stream and the metal oxide to form a metal carbonate,
   (c) passing the ES stream through the metal carbonate produced in (b) under conditions to remove oxides of nitrogen and sulfur from the ES stream.

2. The process of claim 1 wherein the gas stream in (a) and the metal oxide in (b) are produced from decomposition of alkali-metal carbonate into metal oxide and the purified carbon dioxide gas stream, whereby the cycle stream is a recycle stream recycling carbon dioxide gas into the metal oxide.

* * * * *